US010627622B2

United States Patent
Kuehne

(10) Patent No.: US 10,627,622 B2
(45) Date of Patent: Apr. 21, 2020

(54) METHOD FOR OPERATING A MOBILE VIRTUAL REALITY SYSTEM IN A MOTOR VEHICLE, AND MOBILE VIRTUAL REALITY SYSTEM

(71) Applicant: AUDI AG, Ingolstadt (DE)

(72) Inventor: Marcus Kuehne, Beilngries (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/751,580

(22) Filed: Jun. 26, 2015

(65) Prior Publication Data
US 2015/0378156 A1 Dec. 31, 2015

(30) Foreign Application Priority Data

Jun. 26, 2014 (DE) .................. 10 2014 009 697

(51) Int. Cl.
*G06F 3/01* (2006.01)
*G02B 27/01* (2006.01)
*G06Q 30/06* (2012.01)

(52) U.S. Cl.
CPC .......... *G02B 27/017* (2013.01); *G06F 3/012* (2013.01); *G02B 2027/014* (2013.01); *G02B 2027/0187* (2013.01); *G06Q 30/0621* (2013.01)

(58) Field of Classification Search
CPC ......... G06F 3/012; G06F 3/01; G02B 27/017; G02B 2027/0187; G02B 2027/014; G06Q 30/0621
See application file for complete search history.

(56) References Cited

U.S. PATENT DOCUMENTS

| 5,742,264 | A | | 4/1998 | Inagaki et al. | |
|---|---|---|---|---|---|
| 5,831,584 | A | * | 11/1998 | Socks | G06F 3/011 345/158 |
| 6,151,060 | A | * | 11/2000 | Tabata | H04N 13/0497 345/8 |
| 7,761,269 | B1 | * | 7/2010 | Kraal | G06F 3/011 703/1 |
| 8,872,766 | B2 | * | 10/2014 | Moore | G02B 27/01 345/157 |
| 8,988,465 | B2 | * | 3/2015 | Baron | G06T 19/006 345/632 |

(Continued)

FOREIGN PATENT DOCUMENTS

DE   10 2014 009 697   6/2014

OTHER PUBLICATIONS

German Office Action for German Priority Patent Application No. 10 2014 009 697.1, dated Mar. 25, 2015, 9 pages.

(Continued)

*Primary Examiner* — Jeff Piziali
(74) *Attorney, Agent, or Firm* — Staas & Halsey LLP

(57) ABSTRACT

A method operates a mobile virtual reality system in a motor vehicle. The method involves providing a configuration of a virtual motor vehicle, detecting a position of a pair of virtual reality glasses arranged in the motor vehicle, in particular a pair of virtual reality glasses that a user has put on, and operating the virtual reality glasses such that they display the configured virtual motor vehicle from a virtual viewing position that corresponds to the detected position of the virtual reality glasses in the motor vehicle. A mobile virtual reality system includes the pair of virtual reality glasses.

15 Claims, 2 Drawing Sheets

(56) References Cited

U.S. PATENT DOCUMENTS

| | | | | |
|---|---|---|---|---|
| 9,207,758 B2* | 12/2015 | Cernasov | ................. | G06F 3/012 |
| 9,317,759 B2* | 4/2016 | Inada | ..................... | B60K 35/00 |
| 2009/0189974 A1* | 7/2009 | Deering | .................. | G09G 3/02 |
| | | | | 348/46 |
| 2013/0257899 A1* | 10/2013 | Baron | .................. | G06T 19/006 |
| | | | | 345/619 |
| 2014/0354516 A1* | 12/2014 | Pfannstiel | ................. | B60R 1/00 |
| | | | | 345/8 |
| 2015/0097860 A1* | 4/2015 | Alaniz | ................... | G06F 3/011 |
| | | | | 345/633 |
| 2015/0234186 A1* | 8/2015 | Meadows | ............ | G02B 27/017 |
| | | | | 345/8 |
| 2015/0309562 A1* | 10/2015 | Shams | .................... | G08B 6/00 |
| | | | | 345/8 |

OTHER PUBLICATIONS

H. M. Khalid et al., "The CATER Approach to Vehicle Mass Customization," Industrial Engineering and Engineering Management, IEEE International Conference, 2007, pp. 1273-1276.

Paul Grimm et al., "Virtual and Augmented Reality (VR/AR)," Berlin Heidelberg: Springer, 2013, pp. 12-13, 149-150 and 203-205 http://rd.springer.com/book/10.1007/978-3-642-28903-3.

\* cited by examiner

METHOD FOR OPERATING A MOBILE VIRTUAL REALITY SYSTEM IN A MOTOR VEHICLE, AND MOBILE VIRTUAL REALITY SYSTEM

CROSS REFERENCE TO RELATED APPLICATIONS

This application is based on and hereby claims priority to German Application No. 10 2014 009 697.1 filed on Jun. 26, 2014, the contents of which are hereby incorporated by reference.

BACKGROUND

The invention relates to a method for operating a mobile virtual reality system in a motor vehicle and to a mobile virtual reality system.

What are known as virtual reality glasses are increasingly being used particularly in the computer games sector. A pair of virtual reality glasses are a special form of "head-mounted display", the term used for a visual display unit worn on the head. The glasses present images on a screen close to the eyes or project these images directly onto the retina. A pair of virtual reality glasses, however, also has sensors for detecting head movements. The display of the computed graphics can thereby by adapted to the movements of the wearer of the glasses. The proximity of the body means that the displayed image areas of head-mounted displays appear considerably larger than the freestanding screens, and in the extreme case even cover the entire field of vision of the user. Since the display uses the head posture to follow all the head movements of the wearer, the wearer gets the feeling of moving directly in a computer-generated visual landscape.

Hence such virtual reality glasses can be used to represent a virtual reality, where the term virtual reality usually denotes the representation and simultaneous perception of reality in terms of its physical properties in an interactive virtual environment that is computer-generated in real time.

Virtual reality systems comprising such virtual reality glasses could thus be used in the future also for presenting different products, in particular in the sales process.

SUMMARY

One possible object is to provide a method for operating a mobile virtual reality system in a motor vehicle, and to provide a mobile virtual reality system which can be used to perform a particularly realistic product presentation of a motor vehicle.

The inventor proposes a method for operating a mobile virtual reality system in a motor vehicle. According to the method, a configuration of a virtual motor vehicle is provided. A position of a pair of virtual reality glasses arranged in the motor vehicle, in particular a pair of virtual reality glasses that a user has put on, is detected. The virtual reality glasses are operated such that they display the configured virtual motor vehicle from a virtual viewing position that corresponds to the detected position of the virtual reality glasses in the motor vehicle.

The term "mobile" in connection with the virtual reality system shall be understood to mean in particular that all the elements of the virtual reality system can be carried particularly easily and ideally can be used independently of sources of electrical power, in particular by suitable battery operation. Thus a major advantage of such virtual reality systems is that they are also suitable for mobile use. This can create huge added value, especially in the field of automobile sales, if the salesperson, for example, drives with a test vehicle to a prospective or potential customer and, using the proposed method, enables this customer to have a configuration required by the customer displayed virtually. The potential customer can thus sit in the vehicle, experience the relevant materials of the test vehicle, specify the personal interior he requires and relevant optional equipment, and touch the elements of the real motor vehicle, for instance the steering wheel, the controls and the like, while being shown his virtual required configuration by the virtual reality glasses. The proposed method creates a particularly immersive and authentic sales experience, with the advantage that in reality there is no need to provide in advance the particular configuration required by the potential customer.

In an advantageous embodiment, the motor vehicle belongs to the same model range as the configured virtual motor vehicle. This ensures that the real motor vehicle at least has the same dimensions as the potential vehicle required, which is in the form of the configured virtual motor vehicle. This means in particular that there is no need for a complex conversion to be performed when the virtual motor vehicle is displayed by the virtual reality glasses, because the virtual dimensions of the virtual motor vehicle equal those of the real motor vehicle, or at least the proportions correspond to each other. Preferably as the real vehicle provided with the fullest range of accessories possible. The real vehicle thus comprises in particular practically all the possible buttons and switches associated with various optional equipment.

In a further advantageous embodiment, a configuration menu, which can be used to change the configuration of the virtual motor vehicle, is displayed by the virtual reality glasses. A potential buyer can thus be provided with a facility in the form of the configuration menu that can be used by the potential buyer to select or deselect individual items of optional equipment during the virtual product presentation for example. Alternatively or additionally, it is also possible that a salesperson, who is sitting, for example, together with the potential customer in the real motor vehicle, has also displayed the configuration menu on a notebook or a tablet computer, so that the salesperson can himself make various configuration suggestions. The provided configuration of the virtual motor vehicle can thus be adapted particularly easily.

According to a further advantageous embodiment, particular elements of the motor vehicle that have been changed using the configuration menu are displayed by the virtual reality glasses. This can be done substantially in real time, provided a suitable data processing device of the mobile virtual reality system is capable of doing so. For example, the potential customer who is wearing the virtual reality glasses can use the configuration menu to change an item of infotainment equipment in the virtual motor vehicle, decorative shades or the like, and can have these displayed by the virtual reality glasses substantially immediately. The potential customer can thereby get successively closer to his preferred, required configuration of the motor vehicle. In addition, it is also possible that the salesperson sitting beside the customer likewise makes configuration suggestions that are displayed substantially immediately by the virtual reality glasses.

According to a further advantageous embodiment, the virtual reality glasses are operated such that they display the configured virtual motor vehicle from a virtual angle of view that corresponds to a detected orientation of the virtual reality glasses in the real motor vehicle and/or to a detected gaze direction of the user. The wearer of the virtual reality glasses can thus easily change his angle of view onto the displayed virtual motor vehicle by moving his head to the left and right or up and down. Alternatively or additionally, the virtual reality glasses can have a suitable eye-tracking device that can be used to detect the particular gaze direction of the user. It is thereby possible that the virtual angle of view from which the virtual motor vehicle is currently being displayed can be adapted according to the currently detected gaze direction of the user. The user can hence intuitively control what he currently wishes to look at exactly from the displayed virtual motor vehicle.

According to a further advantageous embodiment, a change to a visual indicator of the motor vehicle caused by operating a control of the motor vehicle is then displayed accordingly virtual motor vehicle displayed by the virtual reality glasses. For example, a data processing device of the virtual reality system can have a data link to the motor vehicle, so that operations on various controls of the real motor vehicle and the effects thereof on corresponding visual indicators of the real motor vehicle are signaled to the data processing device. This device can in turn use this information to control the virtual reality glasses in such a way that they can represent virtually the changes in the visual indicators correspondingly associated with the currently made control operations. In addition, the virtual reality system can detect, for example, a suitable camera system for detecting control operations of the user who is wearing the virtual reality glasses, or also other occupants of the vehicle. It is thereby also possible to detect the operation of real controls and the effects thereof on corresponding visual indicators of the real motor vehicle, and to transmit same to the virtual reality glasses in such a way that the virtual reality glasses represent virtually the corresponding visual changes in particular in the vehicle interior. This enables a particularly immersive and authentic experience of the virtually displayed vehicle interior.

The proposed mobile virtual reality system comprises a pair of virtual reality glasses and a detection device, which is designed to detect a position of the virtual reality glasses in a motor vehicle. The virtual reality system additionally comprises a data processing device, which is designed to provide a configuration of a virtual motor vehicle and to control the virtual reality glasses such that they display the configured virtual motor vehicle from a virtual viewing position that corresponds to the detected position of the virtual reality glasses in the motor vehicle. Advantageous embodiments of the proposed method shall be considered to be advantageous embodiments of the proposed mobile virtual reality system, said mobile virtual reality system in particular performs the proposed method.

BRIEF DESCRIPTION OF THE DRAWINGS

These and other objects and advantages of the present invention will become more apparent and more readily appreciated from the following description of the preferred embodiments, taken in conjunction with the accompanying drawings of which.

Figure 1:
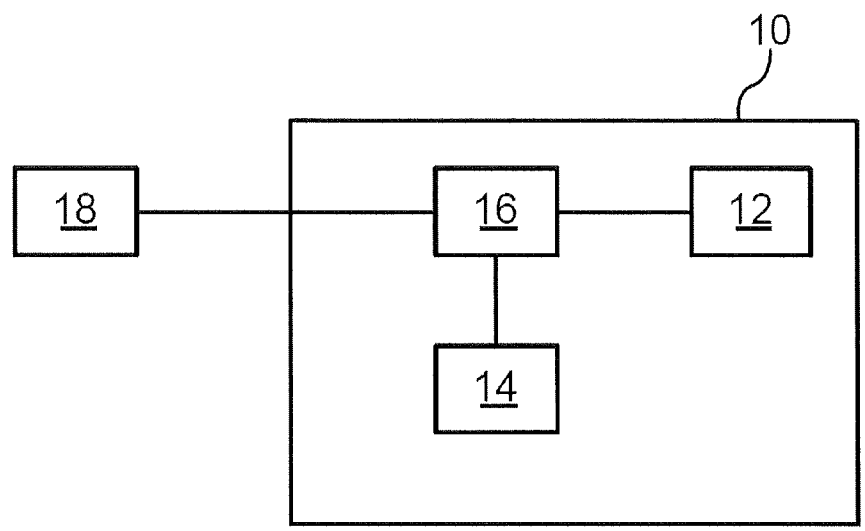
FIG. 1 is a schematic diagram of a mobile virtual reality system, which comprises, inter alia, a pair of virtual reality glasses, which can be used to display a configured virtual motor vehicle.

In the figures, elements that are identical or have the same function are denoted by the same reference signs.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

FIG. 1 shows in a schematic diagram a mobile virtual reality system denoted as a whole by 10. The virtual reality system 10 comprises a pair of virtual reality glasses 12, a detection device 14 and a data processing device 16. The data processing device 16 here has a data link to a motor vehicle 18.

The detection device 14 is designed to detect a position of the virtual reality glasses 12 in a motor vehicle. Furthermore, the detection device 14 is also designed to detect the orientation of the virtual reality glasses 12 in the motor vehicle. For example, the detection device 14 for detecting the position of the virtual reality glasses 12 can comprise an optical detection system, for instance a camera system or the like, which can be positioned in a motor vehicle so that the position of the virtual reality glasses 12 and, if applicable, also the orientation thereof, can be detected by the optical detection system. Alternatively or additionally, it can also be provided, for example, that infrared LEDs are mounted on the virtual reality glasses 12, where the detection device comprises suitable receiving devices that can determine from the received infrared beams the position and, if applicable, also the orientation of the virtual reality glasses 12.

In addition, the virtual reality glasses 12 comprise sensors, in particular acceleration sensors, which can be used to detect the respective spatial orientation of the virtual reality glasses 12.

The data processing device 16 is here in the form of a notebook or tablet computer so that it can be carried particularly easily and in particular can also be operated for prolonged periods of time without an external power supply. The data processing device 16 is designed to provide a configuration of a virtual motor vehicle, and to control the virtual reality glasses 12 such that they display the configured motor vehicle from a virtual viewing position that corresponds to the detected position of the virtual reality glasses 12 in the motor vehicle 18.

Figure 2:
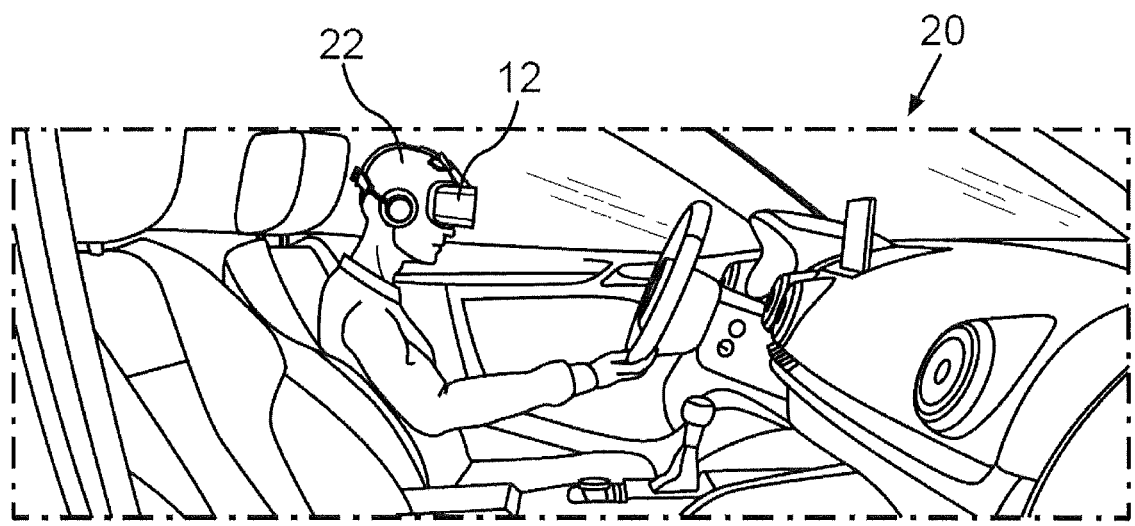
FIG. 2 is a side view of a motor vehicle in which is shown a user wearing a pair of virtual reality glasses.

FIG. 2 shows a vehicle interior 20 of the motor vehicle 18 in a side view. As can be seen, a user 22 is sitting in the driver's seat of the motor vehicle 18 and has put on the virtual reality glasses 12. A salesperson (not shown here) for example can have made an appointment with the user 22, having already asked in advance which model range the user 22 is interested in. The salesperson drives with the motor vehicle 18 from the corresponding model range to the user 22 in order to present the motor vehicle 18 to the user more closely. For instance the user 22 can already have configured a virtual motor vehicle in advance of the meeting with the salesperson, so that this is already available to the salesperson and hence to the data processing device 16. The aim is now for the user 22 to be able to use the virtual reality glasses 12 to display in particular the vehicle interior 20 according to the user's required configuration of the pre-configured virtual motor vehicle.

Figure 3:
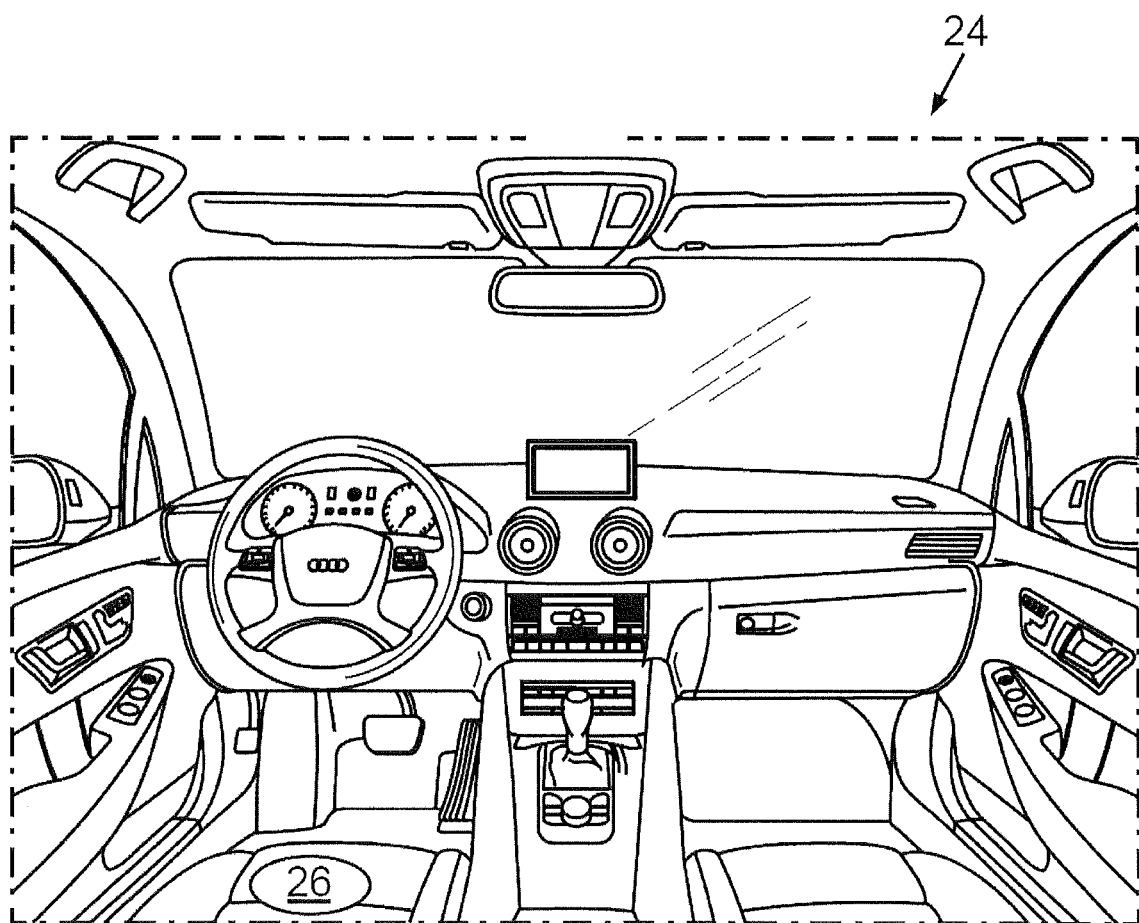
FIG. 3 shows a virtual cockpit of the motor vehicle, which cockpit is displayed by the virtual reality glasses worn by the user.

FIG. 3 shows a virtual vehicle interior (not described in greater detail) of the preconfigured virtual motor vehicle 24, just as it is displayed by the virtual reality glasses 12. The configuration of the virtual motor vehicle 24 is here provided by the data processing device 16. The position of the virtual reality glasses 12 in the real motor vehicle, i.e. in the vehicle interior 20, is detected continuously. The data processing device 16 in this case controls the virtual reality glasses 12 such that they display the configured motor vehicle 24 from a virtual viewing position 26 that corresponds to the detected position of the virtual reality glasses 12 in the real motor vehicle.

Thus in the present case, the virtual reality glasses 12 display to the user 22 the virtual cockpit of the virtual motor vehicle 24 from the driver's seat. The real motor vehicle that the salesperson has brought along preferably belongs to the same model range as the configured virtual motor vehicle 24. The user 22 can now use the virtual representation to have a look at the preconfigured motor vehicle 24 in detail, in particular in the present case from the driver's seat. The virtual reality glasses 12 are operated here such that they display the configured virtual motor vehicle 24 from a virtual angle of view that corresponds to a detected orientation of the virtual reality glasses 12 in the real motor vehicle and/or to a gaze direction of the user 22, which gaze direction is preferably detected by the virtual reality glasses 12.

The user 22 can hence sweep his gaze over the virtual cockpit by a to-and-from movement, in particular by turning his head 22 to the left or right. This is preferably done in combination with detection of the gaze direction of the user 22, with the result that the currently displayed virtual interior of the virtual motor vehicle 24 is moved just as the user 22 would perceive the real vehicle interior 20 if the user had not put on the virtual reality glasses 12.

In addition, a configuration menu (not shown here), which can be used to change the current configuration of the virtual motor vehicle 24, can be displayed by the virtual reality glasses 12. For example, the user 22 can be provided with an appropriate control device for controlling the configuration menu. This device may be a mouse, a touchpad or the like. The user 22 can now operate particularly easily the configuration menu displayed by the virtual reality glasses 12. For instance, the user can select different fittings for the interior of the virtual motor vehicle or even different options with regard to an infotainment system, the air conditioning or the like. Particular elements of the motor vehicle 24 that have been changed using the configuration menu are modified and displayed accordingly by the virtual reality glasses 12 practically in real time.

It is hence possible for the user 22 to be able to change the original configuration of the motor vehicle 24 easily more or less in real time while sitting in the real motor vehicle 18 and wearing the virtual reality glasses 12.

Alternatively or additionally, it is also possible that the configuration menu is likewise displayed to a salesperson also sitting in the real motor vehicle 18, for example displayed via the data processing device 16 in the form of a laptop. The salesperson can hence also make changes to the configuration menu and hence to the configuration of the virtual motor vehicle 24, for instance in order to show to the user 22 the various possible options for the equipment of the virtual motor vehicle 24.

Thus the currently configured virtual motor vehicle 24 can be displayed in all details by the virtual reality glasses 12 to the user 22 sitting in the real motor vehicle 18. For example, the user can touch the steering wheel of the real motor vehicle 18 while the steering wheel is displayed to the user in the specifically selected optional equipment version according to the current configuration of the virtual motor vehicle 24. In addition, the user can also operate the widest range of controls, for instance an infotainment system, an air conditioning system or the like. A change to a visual indicator of the real motor vehicle caused by operating a real control of the real motor vehicle 18 is here likewise displayed in the virtual cockpit of the virtual motor vehicle 24 by the virtual reality glasses 12.

The information technology link between the motor vehicle 18 and the data processing device 16, as shown schematically in FIG. 1, can be used for this, for example. In the real motor vehicle 18, for instance, the ignition is on but the motor is not running. If the user 22 now operates, for example, a rotary knob on the air conditioning system, thereby changing up or down the temperature, indication on the air conditioning system, then this information can be transmitted from the motor vehicle 18 to the data processing device 16. The data processing device 16 here uses this information to control the virtual reality glasses 12 such that they likewise adjust the change to the virtual display of the virtual air conditioning system.

Alternatively or additionally, it can also be provided that a camera system is installed in the motor vehicle 18, which can be used to detect operations by the user 22 or also by the salesperson on the widest range of controls of the real motor vehicle 18 and to detect resultant changes to corresponding visual indicators. This information can then be processed by the data processing device 16 and used such that the virtual reality glasses 12 also include changes in the visual indicators of the real motor vehicle 18 in the display of the virtual cockpit of the virtual motor vehicle 24. Hence this enables a form of virtual interaction with the displayed virtual motor vehicle 24.

Using the virtual reality system 10 in the manner explained creates a particularly immersive and authentic sales experience without the need for a particular configuration required by a potential customer to exist in reality.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. A method for operating a virtual reality system, comprising:
   providing virtual reality glasses;
   providing a real world motor vehicle;
   providing a menu;
   using the virtual reality system to receive a selection from the menu for motor vehicle equipment, the motor vehicle equipment being available as a purchase option when purchasing a new motor vehicle, the motor vehicle equipment not being included in the real world motor vehicle;
   using the virtual reality system to produce virtual motor vehicle data that models a virtual motor vehicle, the virtual motor vehicle including the motor vehicle equipment;
   using the virtual motor vehicle data and the virtual reality glasses to produce a virtual reality simulation, the virtual reality simulation being produced by displaying the virtual motor vehicle using the virtual reality glasses, the virtual reality simulation being produced while the virtual reality glasses are being worn by a real world human located inside a passenger compartment of the real world motor vehicle;

detecting movement of the virtual reality glasses in the passenger compartment of the real world motor vehicle;

modifying the virtual reality simulation to change a virtual viewing position, the virtual viewing position being a position from which the virtual motor vehicle is depicted when displayed by the virtual reality glasses, the virtual viewing position being changed to move in a same direction as the movement of the virtual reality glasses and with a same speed as the movement of the virtual reality glasses;

monitoring movement of the real world human located inside the passenger compartment of the real world motor vehicle; and using the virtual reality simulation to display a virtual human with the virtual reality glasses, the virtual human being displayed inside a passenger compartment of the virtual motor vehicle, the virtual human being displayed to move in a same direction as the movement of the real world human and with a same speed as the movement of the real world human.

2. The method according to claim 1, wherein
a motor vehicle manufacturing group produces a motor vehicle model platform, the motor vehicle model platform having a plurality of motor vehicle models, each of the plurality of motor vehicle models having an equal first interior compartment dimension and an equal second interior compartment dimension, and
the real world motor vehicle and the virtual motor vehicle belong to the motor vehicle model platform.

3. The method according to claim 1, wherein
the real world motor vehicle is a motor vehicle model produced by a motor vehicle manufacturer, and
the virtual reality system uses the virtual motor vehicle to simulate the motor vehicle model of the real world motor vehicle.

4. The method according to claim 1, wherein
the real world motor vehicle has buttons and switches, and
the virtual reality system uses the virtual reality glasses to display the buttons and switches and simulate the buttons an switched in the virtual motor vehicle.

5. The method according to claim 1, wherein
the menu is displayed by the virtual reality glasses.

6. The method according to claim 5, wherein
using the virtual reality system to receive a selection from the menu for motor vehicle equipment comprises:
    using the virtual reality system to receive a first selection from the menu, the first selection from the menu being a selection for first motor vehicle equipment, the first motor vehicle equipment being available as a purchase option when purchasing a new motor vehicle, the first motor vehicle equipment not being included in the real world motor vehicle; and
    using the virtual reality system to receive a second selection from the menu, the second selection from the menu being a selection for second motor vehicle equipment, the second motor vehicle equipment being available as a purchase option when purchasing a new motor vehicle, the second motor vehicle equipment not being included in the real world motor vehicle, using the virtual reality system to produce virtual motor vehicle data comprises:
    using the virtual reality system to produce first virtual motor vehicle data, the first motor vehicle data modeling a first virtual motor vehicle, the first virtual motor vehicle including the first motor vehicle equipment; and
    using the virtual reality system to produce second virtual motor vehicle data, the second motor vehicle data modeling a second virtual motor vehicle, the second virtual motor vehicle including the second motor vehicle equipment, using the virtual motor vehicle data and the virtual reality glasses to produce a virtual reality simulation comprises:
    using the first virtual motor vehicle data and the virtual reality glasses to produce a first virtual reality simulation, the first virtual reality simulation being produced by displaying the first virtual motor vehicle using the virtual reality glasses, the first virtual reality simulation being produced while the virtual reality glasses are being worn by the real world human located inside the passenger compartment of the real world motor vehicle; and
    using the second virtual motor vehicle data and the virtual reality glasses to produce a second virtual reality simulation, the second virtual reality simulation being produced by displaying the second virtual motor vehicle using the virtual reality glasses, the second virtual reality simulation being produced while the virtual reality glasses are being worn by the real world human located inside the passenger compartment of the real world motor vehicle, and the method has ordering comprising:
    after using the first virtual motor vehicle data and the virtual reality glasses to produce the first virtual reality simulation, the virtual reality system is used to receive the second selection from the menu; and
    after the virtual reality system is used to receive the second selection from the menu, the second virtual motor vehicle data and the virtual reality glasses are used to produce the second virtual reality simulation.

7. The method according to claim 1, further comprising:
detecting a viewing direction of the real world human by at least one of detecting an orientation of the virtual reality glasses in the real world motor vehicle and detecting a gaze direction of the real world human; and
operating the virtual reality glasses such that virtual reality glasses display the virtual motor vehicle from the viewing direction of the real world human.

8. The method according to claim 1, wherein
a translational movement of the virtual reality glasses relative to the real world motor vehicle changes the virtual viewing position of the virtual motor vehicle, and
a rotational movement of the virtual reality glasses in the real world motor vehicle changes a virtual angle of view of the virtual motor vehicle.

9. The method according to claim 1, wherein
the real world motor vehicle has a real world control element positioned in the real world motor vehicle at a real world position,
the virtual world motor vehicle has virtual control element positioned in the virtual motor vehicle at the real world position,
the method further comprises:

detecting when the real world human touches the real world control element; and changing a display presented on a display screen of the virtual motor vehicle when the real world human touches the real world control element.

10. The method according to claim 9, wherein the real world motor vehicle is linked to the virtual reality system with a data link to transfer information regarding when the real world human touches the real world control element.

11. The method according to claim 1, wherein a camera system in the real world motor vehicle detects a position of the virtual reality glasses in the real world motor vehicle, and detecting movement of the virtual reality glasses comprises repeatedly detecting the position of the virtual reality glasses.

12. The method according to claim 1, wherein the virtual reality glasses have infrared light emitting diodes (LEDs), the real world motor vehicle has a receiving device to receive information from the infrared LEDs to detect a position of the virtual reality glasses in the real world motor vehicle, and detecting movement of the virtual reality glasses comprises repeatedly detecting the position of the virtual reality glasses.

13. A virtual reality system, comprising:

a pair of virtual reality glasses;

a detection device to detect a position of the virtual reality glasses in a real world motor vehicle while being worn by a real world human located inside a passenger compartment of the real world motor vehicle; and a data processing device to:

use the virtual reality system to receive a selection from a menu for motor vehicle equipment, the motor vehicle equipment being available as a purchase option when purchasing a new motor vehicle, the motor vehicle equipment not being included in the real world motor vehicle;

use the virtual reality system to produce virtual motor vehicle data that models a virtual motor vehicle, the virtual motor vehicle including the motor vehicle equipment;

use the virtual motor vehicle data and the virtual reality glasses to produce a virtual reality simulation, the virtual reality simulation being produced by displaying the virtual motor vehicle using the virtual reality glasses, the virtual reality simulation being produced while the virtual reality glasses are being worn by the real world human located inside the passenger compartment of the real world motor vehicle;

detect movement of the virtual reality glasses in the passenger compartment of the real world motor vehicle;

modify the virtual reality simulation to change a virtual viewing position, the virtual viewing position being a position from which the virtual motor vehicle is depicted when displayed by the virtual reality glasses, the virtual viewing position being changed to move in a same direction as the movement of the virtual reality glasses and with a same speed as the movement of the virtual reality glasses;

monitor movement of the real world human located inside the passenger compartment of the real world motor vehicle; and use the virtual reality simulation to display a virtual human with the virtual reality glasses, the virtual human being displayed inside a passenger compartment of the virtual motor vehicle, the virtual human being displayed to move in a same direction as the movement of the real world human and with a same speed as the movement of the real world human.

14. The virtual reality system according to claim 13, wherein the virtual reality system is battery operated.

15. The virtual reality system according to claim 13, wherein the virtual reality glasses display the virtual motor vehicle while the real world motor vehicle is being driven.

* * * * *

UNITED STATES PATENT AND TRADEMARK OFFICE
CERTIFICATE OF CORRECTION

PATENT NO. : 10,627,622 B2
APPLICATION NO. : 14/751580
DATED : April 21, 2020
INVENTOR(S) : Marcus Kuehne Page 1 of 1

It is certified that error appears in the above-identified patent and that said Letters Patent is hereby corrected as shown below:

In the Claims

Column 7, Line 46 (approx.):
In Claim 4, after "buttons" delete "an switched" and insert -- and switches --, therefor.

Signed and Sealed this
Sixteenth Day of June, 2020

Andrei Iancu
*Director of the United States Patent and Trademark Office*